Figure 13:
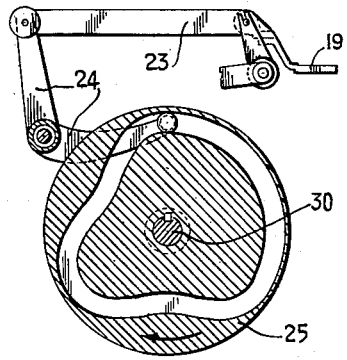
Figure 14:
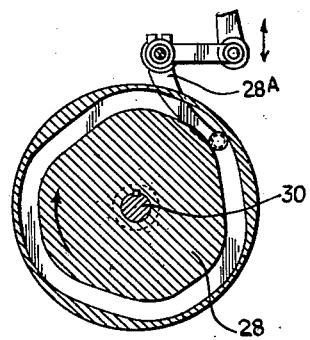

June 29, 1965
A. J. GRINER
3,191,751
METERING AND STACKING APPARATUS
Filed March 25, 1964
13 Sheets-Sheet 1
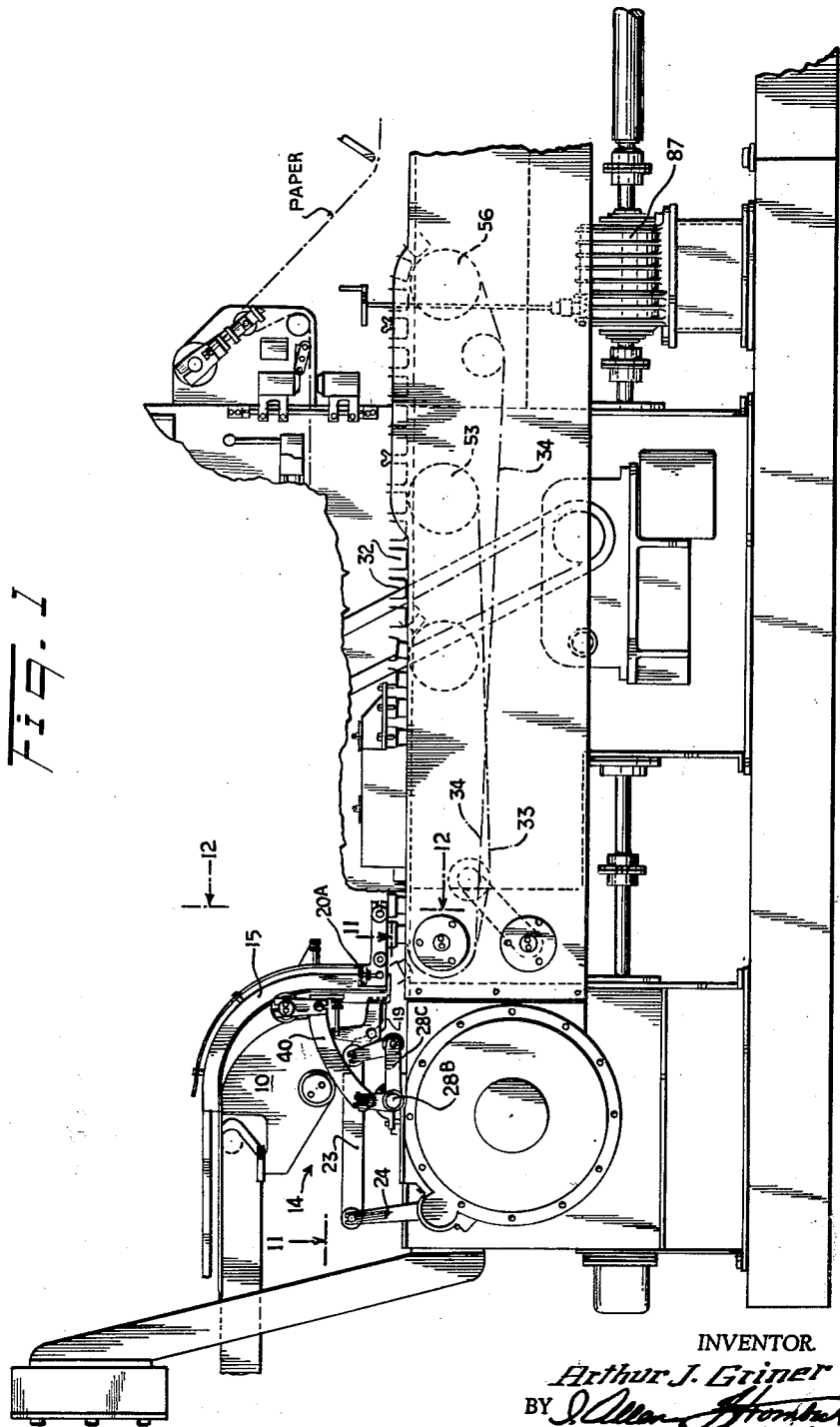
INVENTOR.
Arthur J. Griner
BY June 29, 1965  A. J. GRINER  3,191,751
METERING AND STACKING APPARATUS
Filed March 25, 1964  13 Sheets-Sheet 2
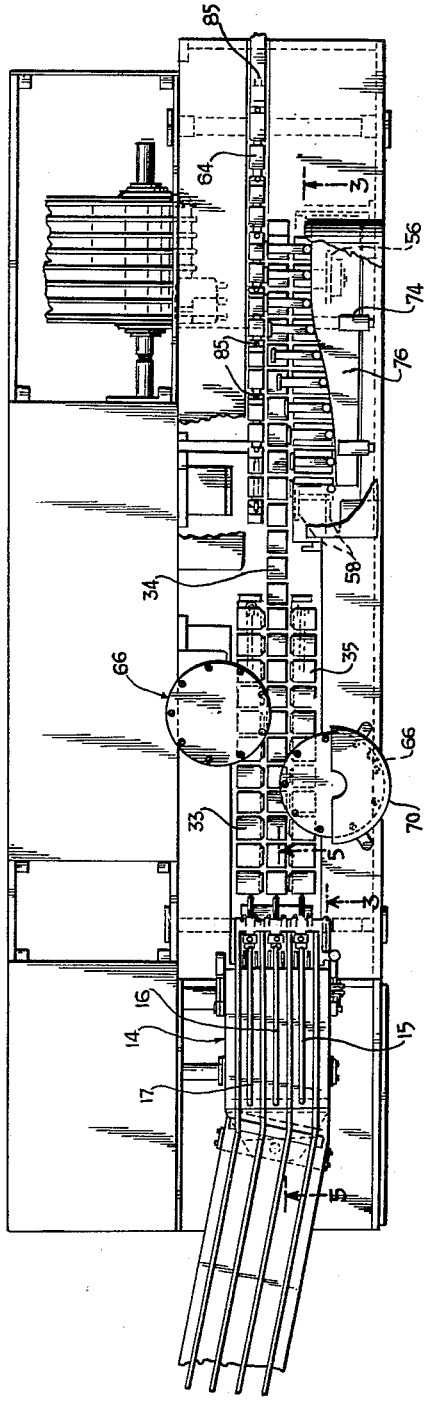
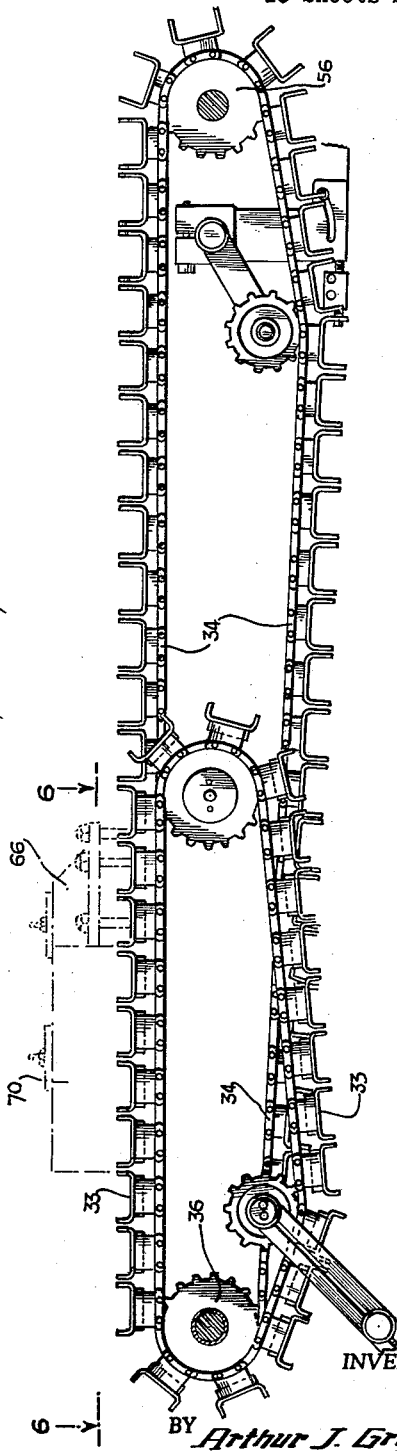
INVENTOR.
Arthur J. Griner
BY J. Allen Strombeck
Patent Agt.

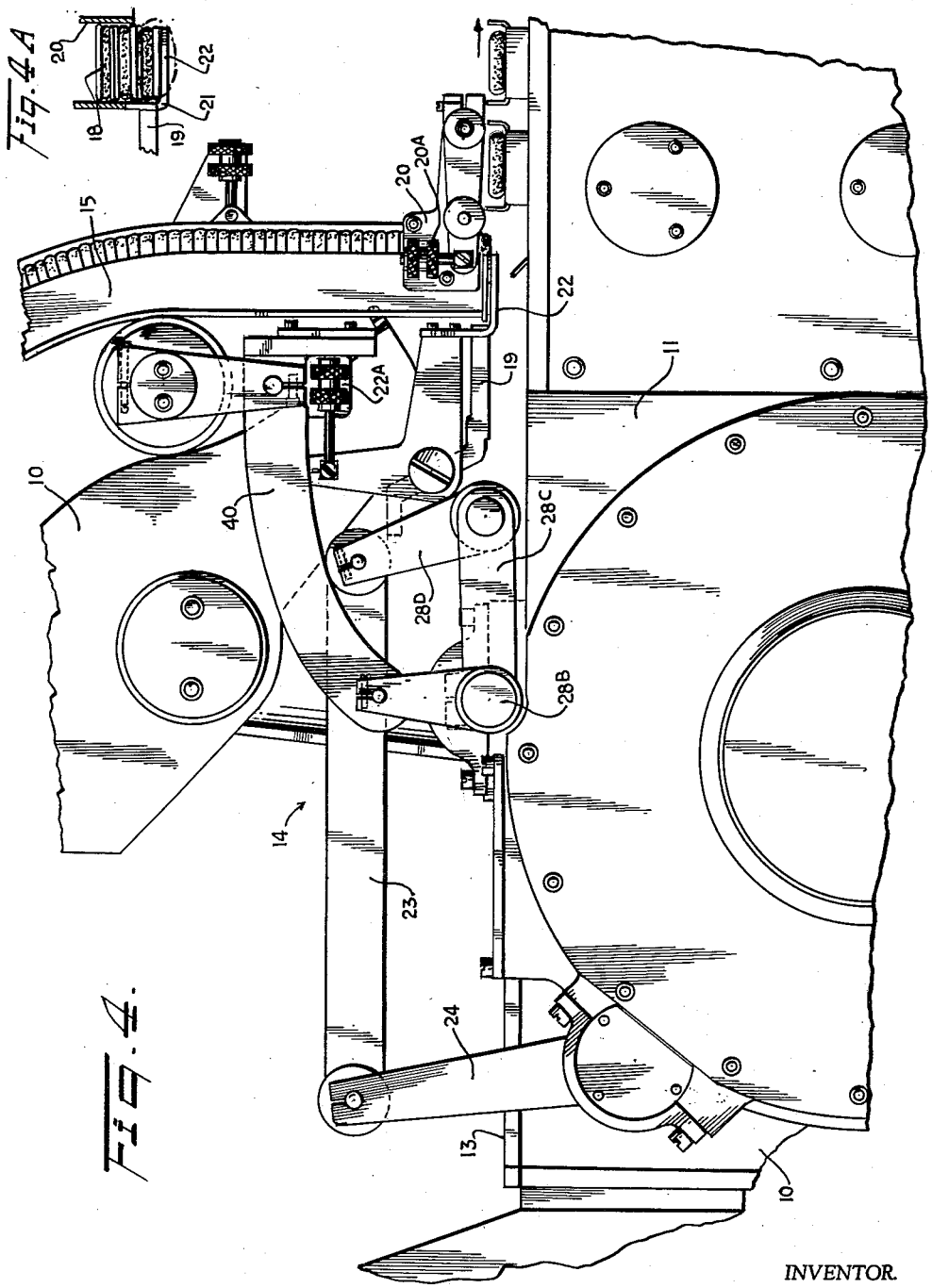

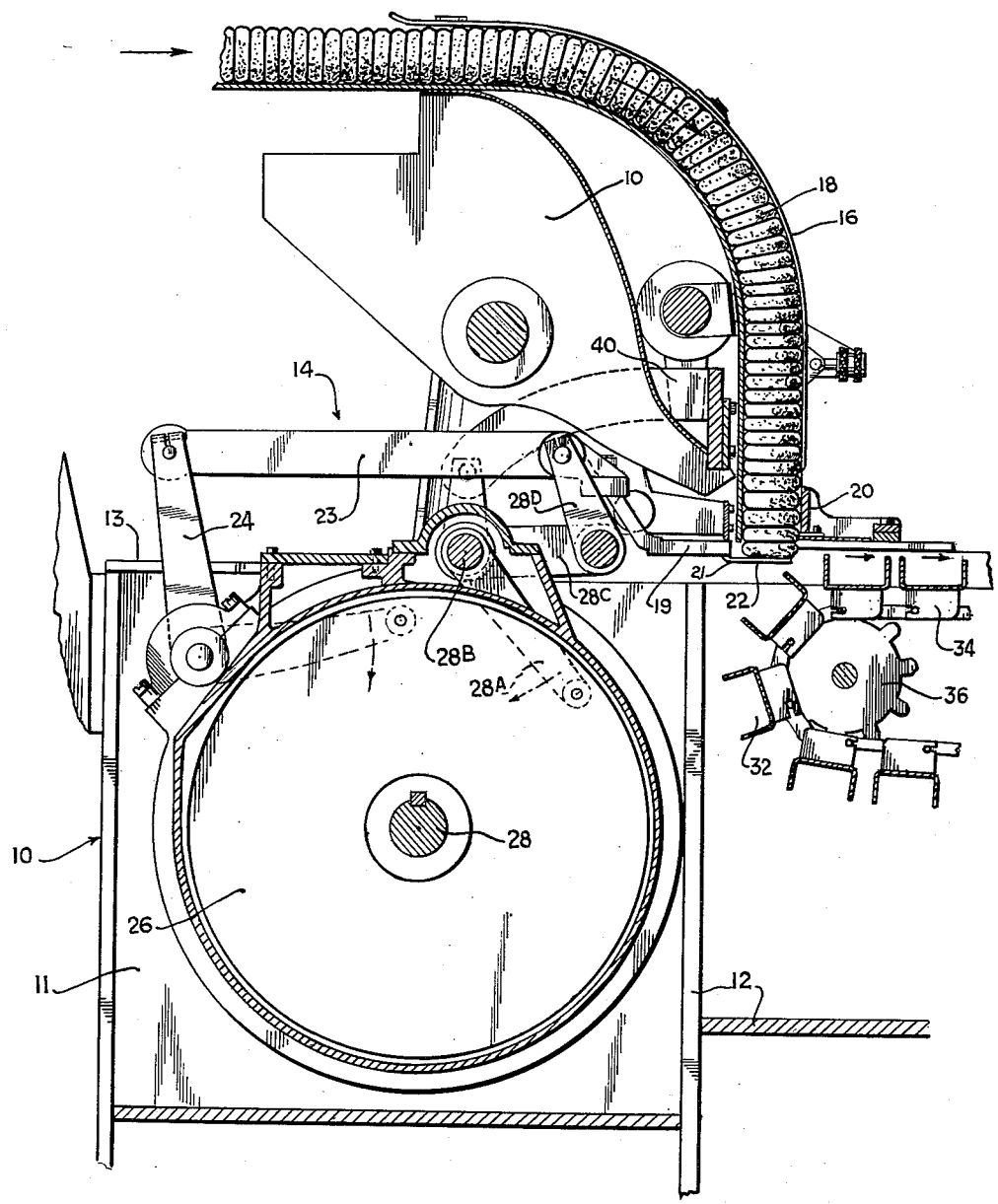

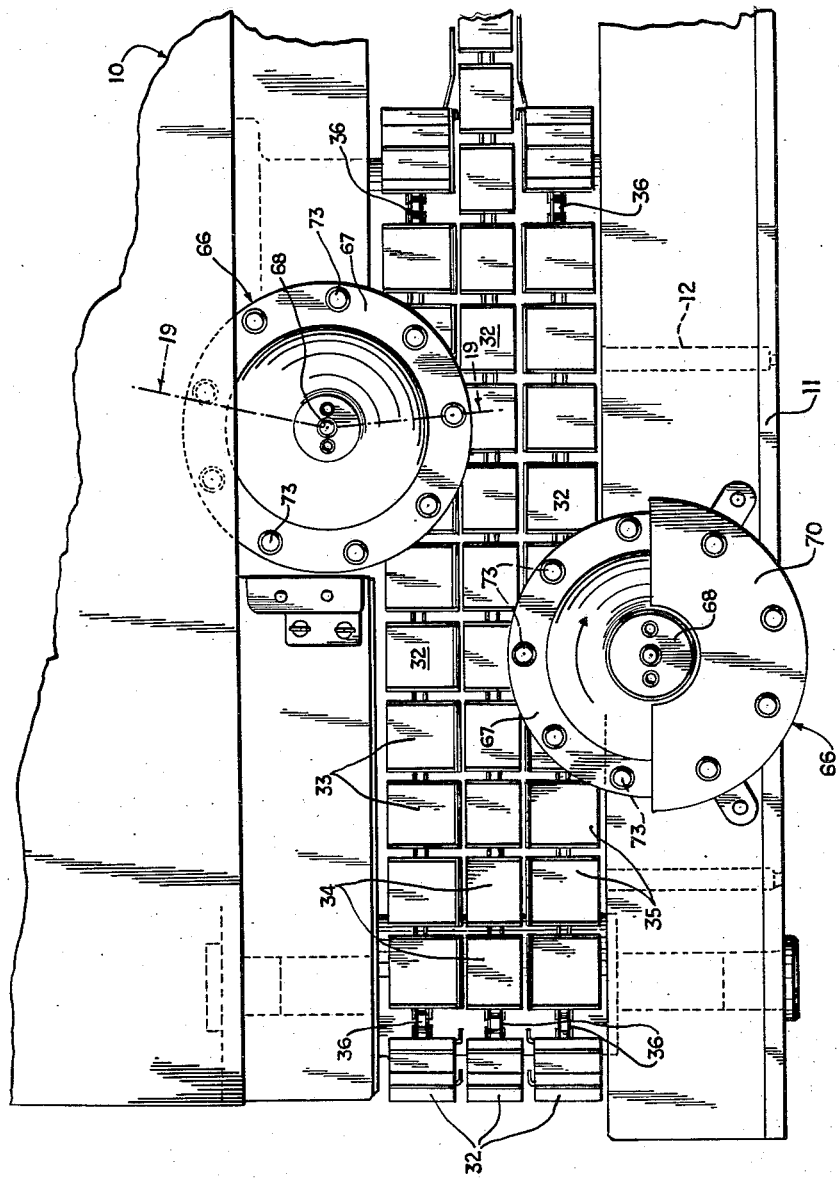

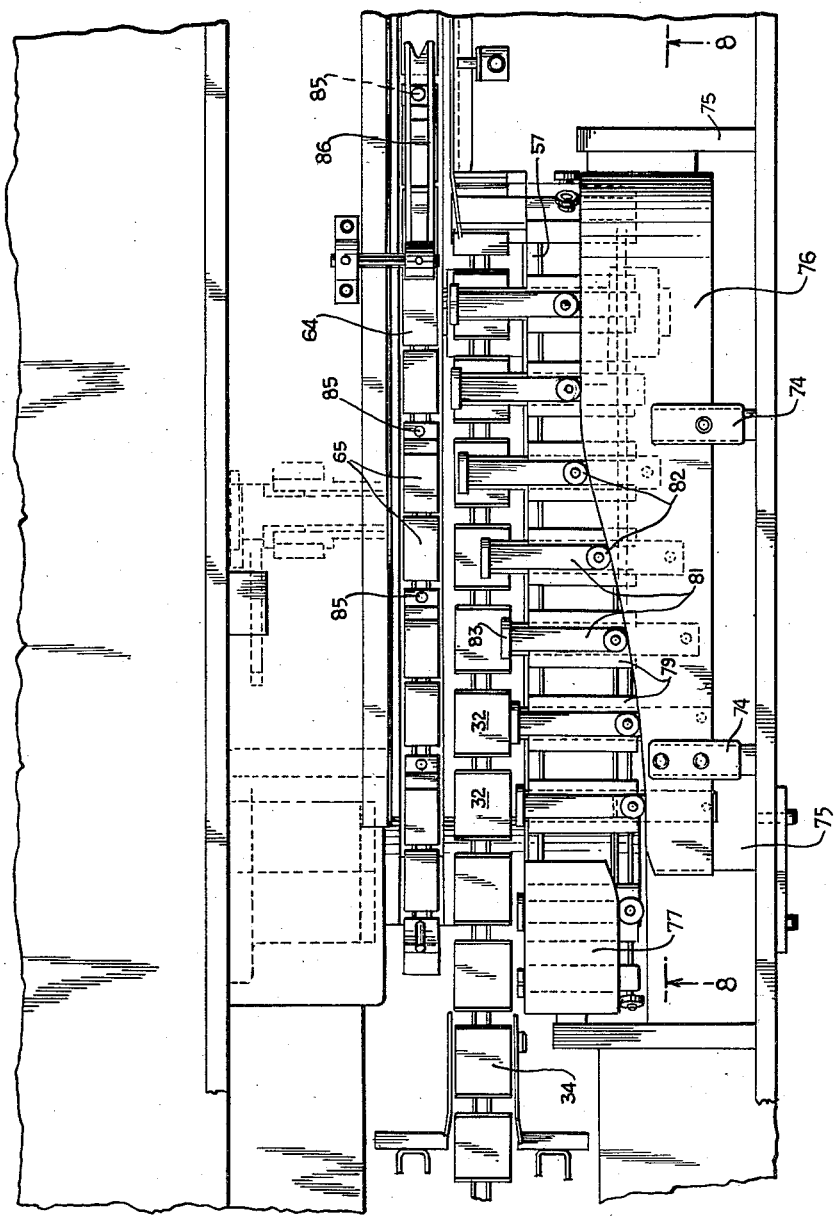

June 29, 1965 A. J. GRINER 3,191,751
METERING AND STACKING APPARATUS
Filed March 25, 1964 13 Sheets-Sheet 7
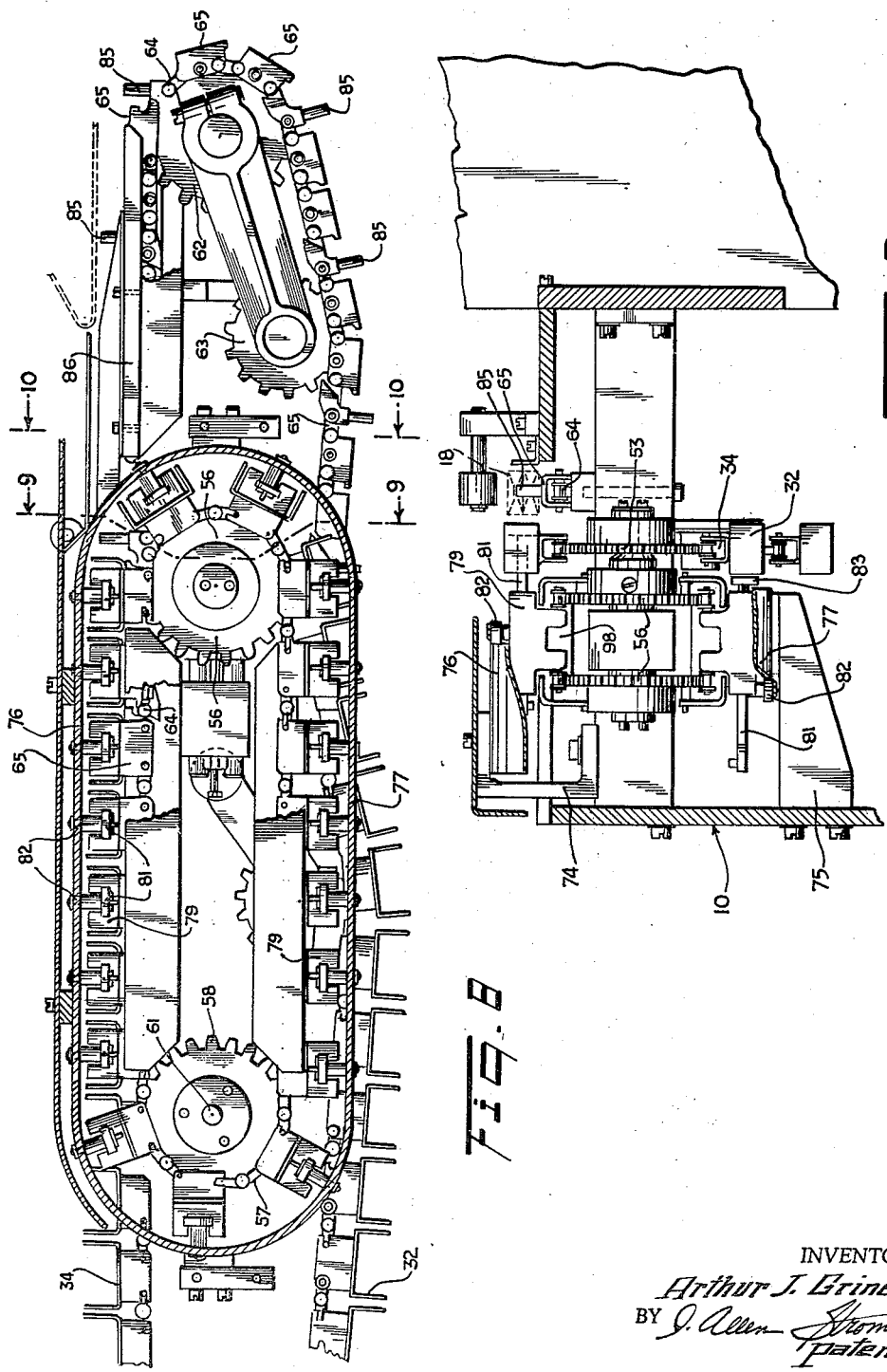
INVENTOR.
Arthur J. Griner
BY J. Allen Stromback
patent Agt.

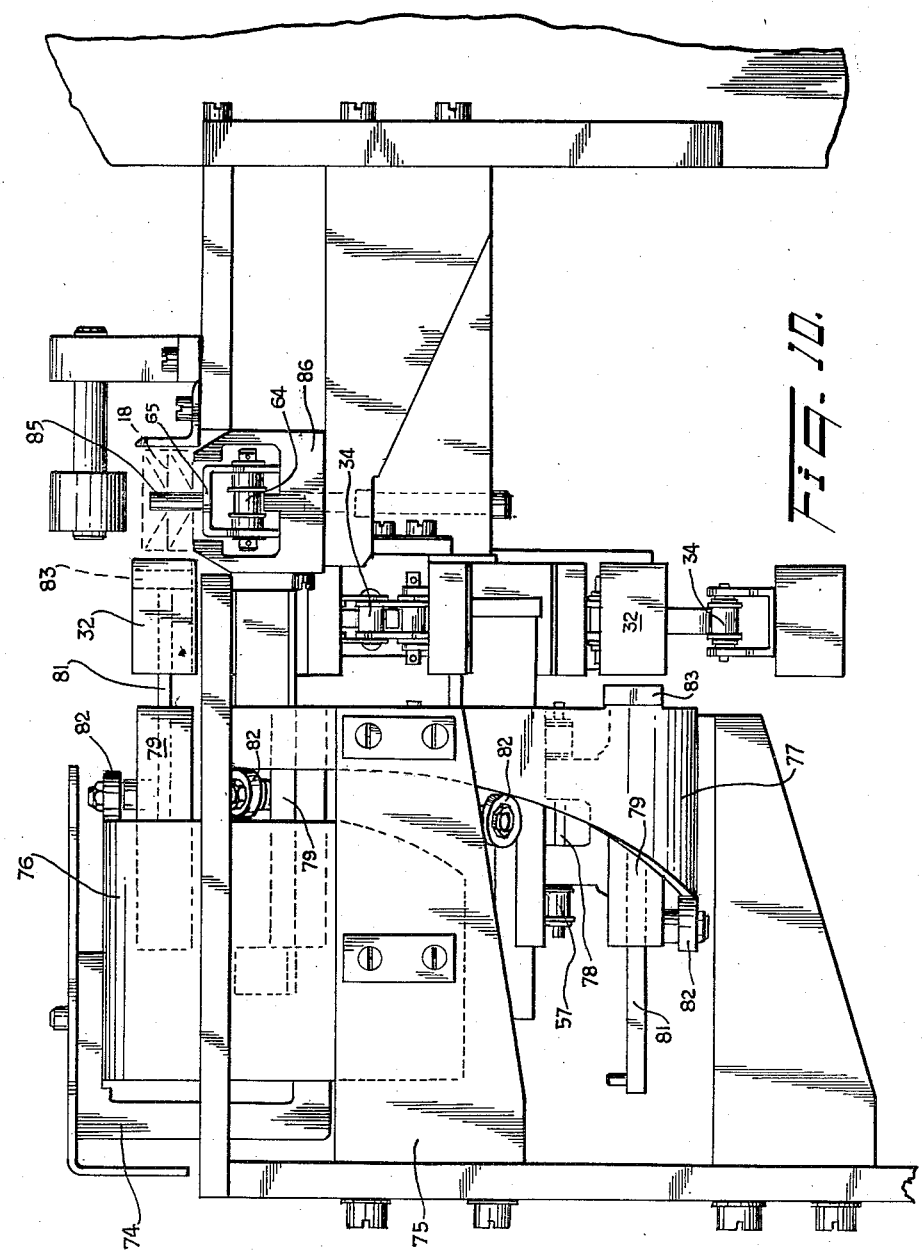

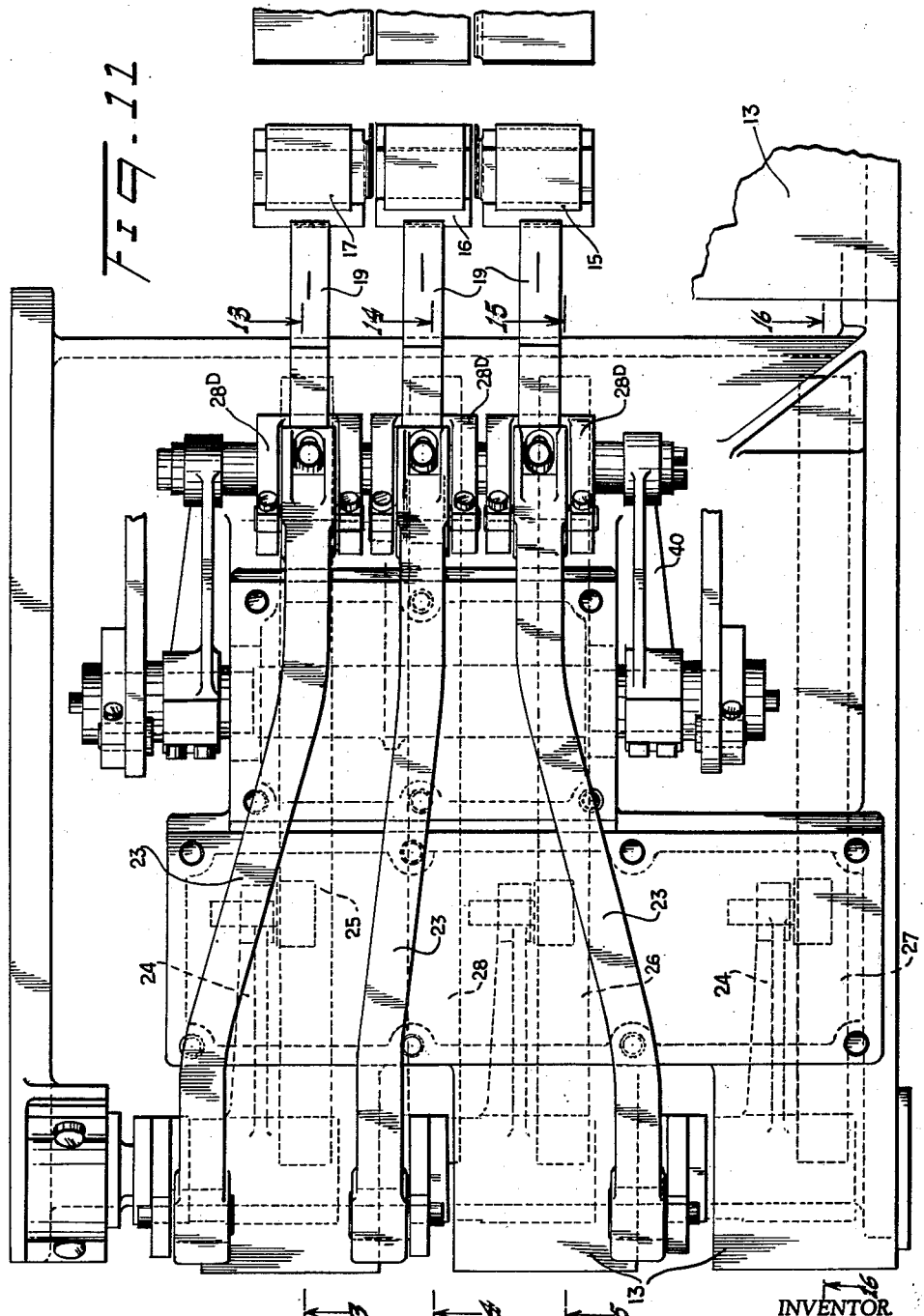

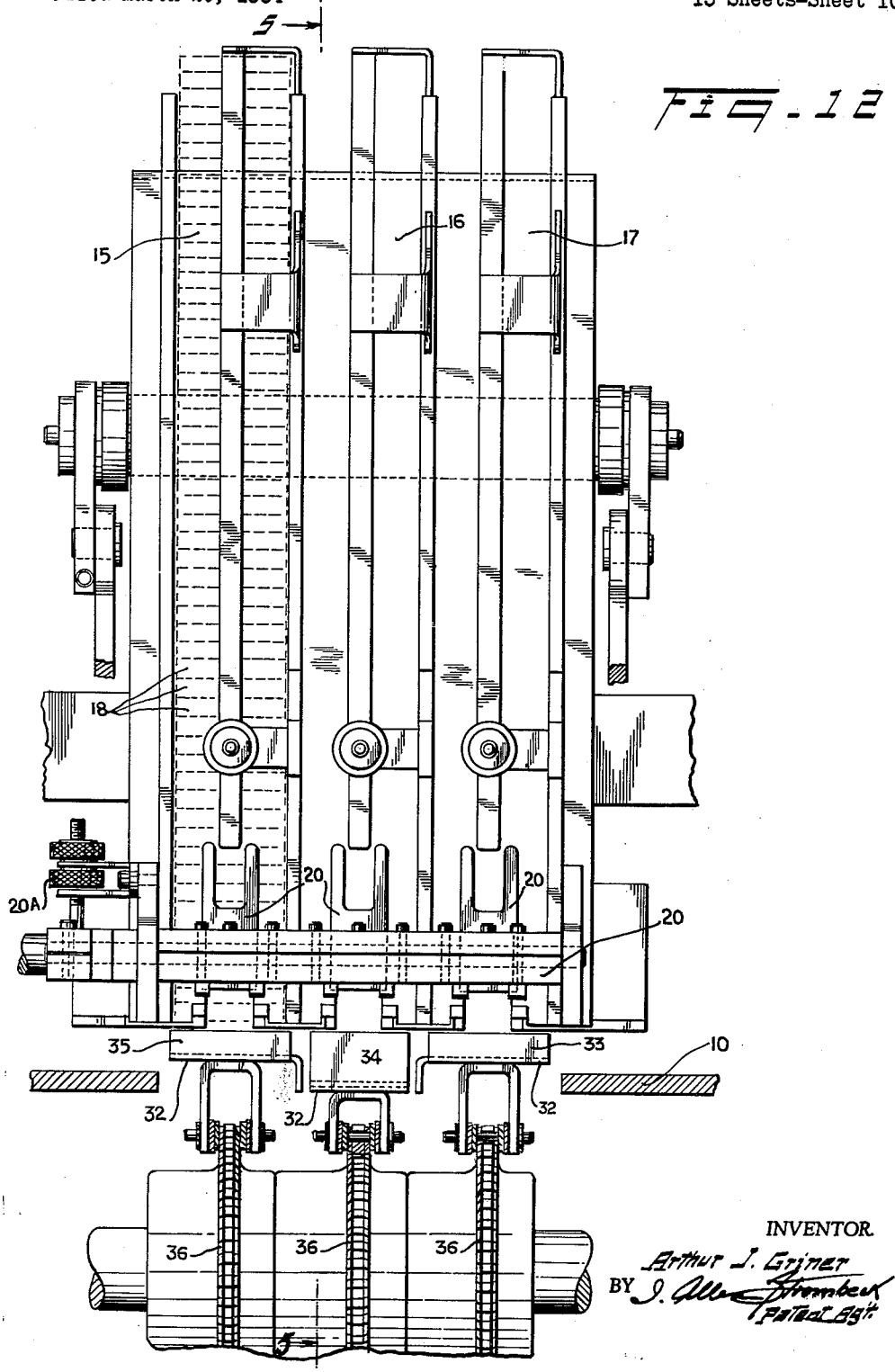

June 29, 1965  A. J. GRINER  3,191,751
METERING AND STACKING APPARATUS
Filed March 25, 1964  13 Sheets-Sheet 11

INVENTOR.
Arthur J. Griner
BY J. Allen Chambers
Patent Agt.

June 29, 1965 A. J. GRINER 3,191,751
METERING AND STACKING APPARATUS
Filed March 25, 1964 13 Sheets-Sheet 12
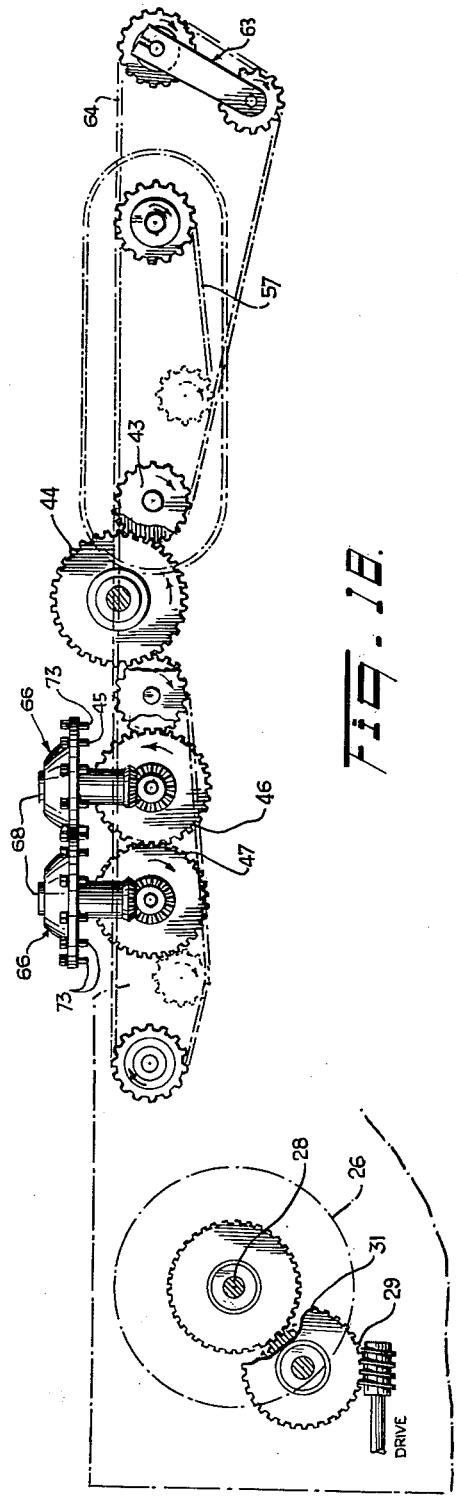
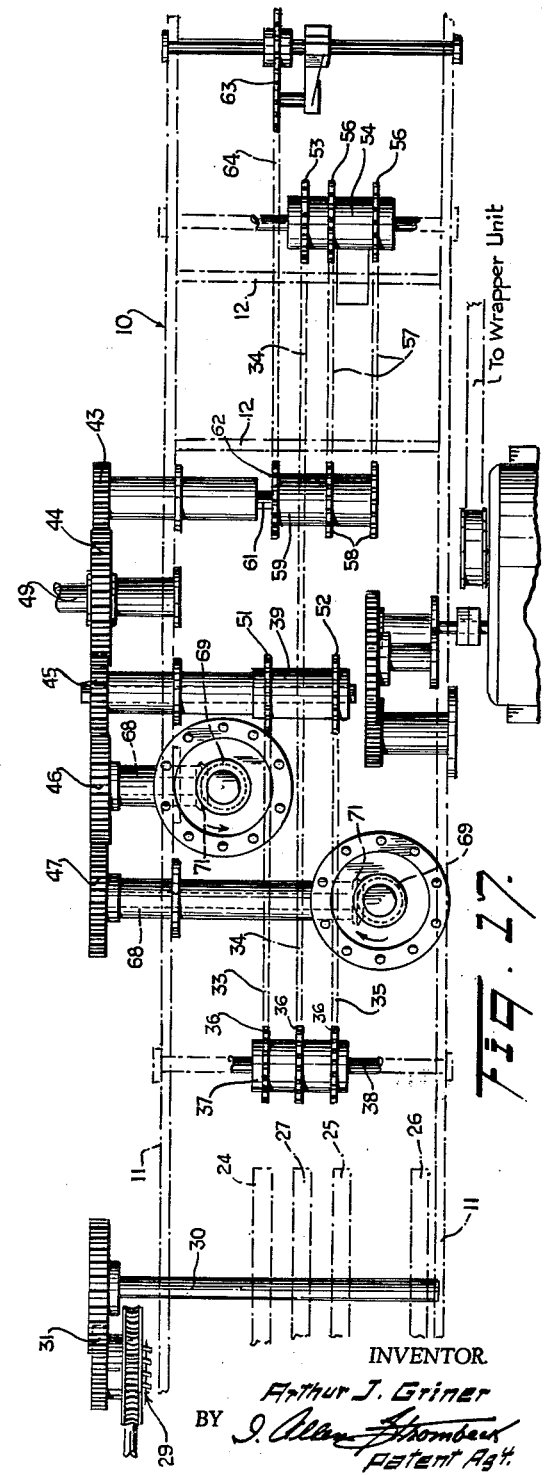
INVENTOR.
Arthur J. Griner
BY
Patent Agt.

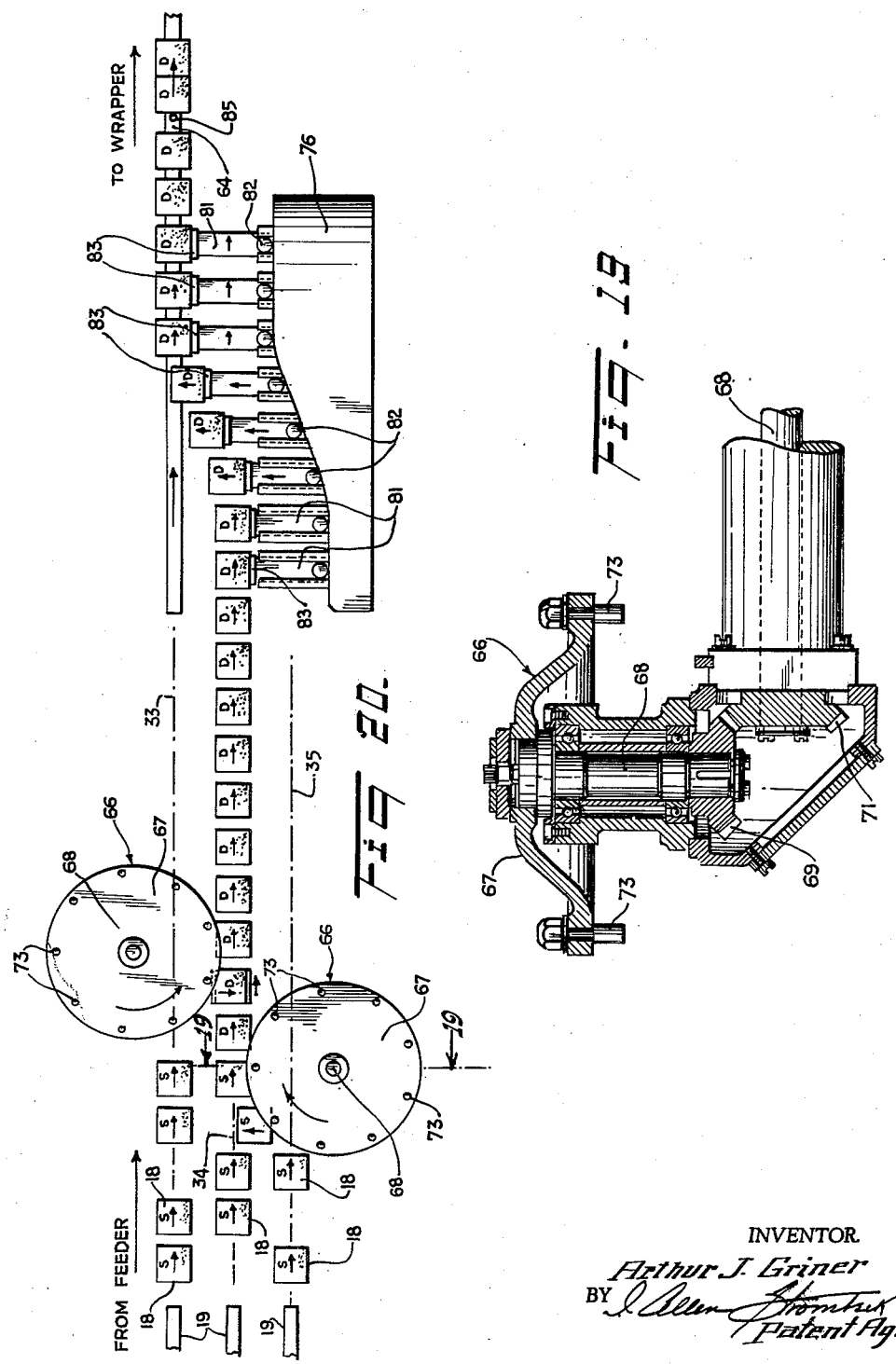

United States Patent Office 3,191,751
Patented June 29, 1965

3,191,751
METERING AND STACKING APPARATUS
Arthur J. Griner, Wyckoff, N.J., assignor to National Biscuit Company, a corporation of New Jersey
Filed Mar. 25, 1964, Ser. No. 354,614
19 Claims. (Cl. 198—35)

This invention relates to novel means for metering and stacking an accurate number of articles, and more particularly pertains to an apparatus for automatically, continuously metering and stacking cookie sandwiches to a wrapping machine, ready to be wrapped or otherwise enclosed to form packets or individual servings.

In recent years the demand by the lunch counter and restaurant trade for small packets each containing an individual serving of cookie or cracker sandwiches has increased so rapidly that high speed machines are necessary for production adequate to meet the demand. The present invention makes this possible by producing stacks of sandwiches at a rate higher than has ever been attained before and at a reduced cost.

To the above end a particular object of the invention is to feed simultaneously, plural lines of stacked units such as single sandwiches and then convert these plural lines of units into a single line of items each having the configuration of four sandwich units arranged in two stacks, each two-high, in end to end contactual relationship and without changing the forward or advancing speed of travel of the units.

In the biscuit feeding and packing art it is recognized that the product is fragile and must be assembled for consumer use in packages and at high speed; and to arrange the units of the product, when initially fed to a machine in sandwich form, in another form for convenient handling by wrapping equipment, is a problem that has entailed the use of various carriers in the form of wheels or other devices operating as transfer agents.

It is a further object of the invention to provide a plurality of continuously moving conveyor means to which the units are supplied in controlled order so that an accumulating conveyor can be initially supplied and then re-supplied so that units are accumulated into items during the forward travel of all of the conveyors.

A further object is to provide cross feed means which, coacting with the controlled order of supply, operate to assemble units from certain conveyors to another conveyor in which the units are accumulated, and to transfer said assembled units to a wrapper conveyor in a form to be readily wrapped in a flat packet of four sandwich units arranged in two stacks in end to end or planar relation.

Still further objects are the provision of different transfer means for moving the units from one conveyor to another and to the arrangement of such means for initially assembling the units and then transferring the units to a final conveying means.

With these and other objects in view, the invention comprises certain constructions hereinafter described and then particularly pointed out in the claims and a preferred embodiment of the invention is illustrated in the accompanying drawings, in which:

FIGURE 1 is a view in side elevation of that section of the machine to which the invention relates, including the infeed mechanism, the conveyor mechanism and in diagrammatic outline a fragmentary portion of the paper infeed mechanism showing its relation to the other parts of the machine.

FIG. 2 is a plan view of the biscuit unit infeed mechanism and the conveyors, showing cross feed and transfer means used at a plurality of points in the travel of the conveyors, FIG. 3 is an enlarged section taken on the line 3—3 of FIGURE 2 showing the relation of the conveyors and the driving means therefor, FIG. 4 is an enlarged view in side elevation of the unit infeed means or unit injection, FIG. 4A is a fragmentary section showing the path of movement of the injector slides, FIG. 5 is a view similar to FIG. 4 but taken on the line 5—5 of FIG. 2 to show the relation of the injector to the buckets of the conveyor, FIG. 6 is an enlarged view of a portion of the top of the machine taken substantially on the line 6—6 of FIG. 3, FIG. 7 is an enlarged plan view of a part of the machine showing the mechanism for transferring the cracker units from an accumulator conveyor to a wrapper conveyor, FIG. 8 is a vertical section taken on the line 8—8 of FIG. 7 showing the mounting of the transfer agents, FIG. 9 is a vertical section on line 9—9 of FIG. 8 showing the relation of the transfer cams and the transfer agents controlled thereby and the wrapper conveyor, FIG. 10 is a view taken on the line 10—10 of FIG. 8 showing the relative locations of the transfer agent controlling cams and the wrapper conveyor, FIG. 11 is an enlarged plan view of the infeed or injector end of the machine taken substantially on the line 11—11 of FIG. 1, FIG. 12 is a vertical section taken on the line 12—12 of FIG. 1, just forward of the injector means showing the relation of the conveyors thereto, FIGS. 13, 14, 15 and 16 are sectional views taken on the respective section indicating lines of FIG. 11 showing the shape of the injector or feed slide actuating cams and the elevator cam, FIG. 17 is a schematic plan view of the train of parts employed in driving the cams, conveyors and cross-feed means used in the machine, FIG. 18 is a side view of the parts shown schematically in FIG. 17 to further show the operation thereof, FIG. 19 is a section on line 19—19 of FIG. 6 showing the construction of one of the cross-feed units, and FIG. 20 is a schematic plan view showing the progressive operation of assembling the units and transferring them to the wrapper conveyor in the form of items.

Figure 15:
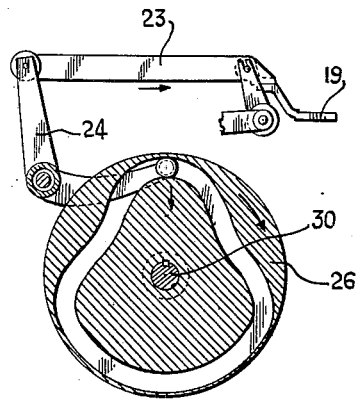
Figure 16:
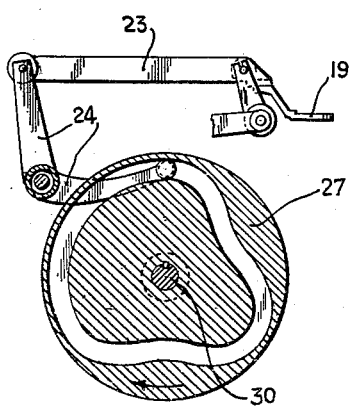

Referring to the drawings in detail, 10 indicates the usual machine machine frame including side walls 11, support bars 12 and top plates 13 upon which, as shown in FIGS. 1, 4 and 5 is mounted at the infeed end a cracker unit feeding device 14 including a plurality of chutes 15, 16 and 17 through which, crackers forming sandwich units 18 or other like articles, are injected or fed. A plurality of these sandwich units 18, in this instance four, are to be stacked two-high in horizontal alignment and fed to a wrapping station for encasement in a single packet or pack. A cracker unit or sandwich unit 18 is pushed out of each chute by a feed slide 19 which is reciprocated through an opening or slot 21 in the lower part of a slide plate or foot 22 underlying the lower open end of each chute. Each slide 19 is reciprocated in an oval path through the medium of a link 23 and a bell crank arm 24 controlled for each slide from the respective cams 25, 26 and 27 (FIGS. 13, 15 and 16). The cams 25, 26 and 27 and an elevator cam 28 are secured to a cam shaft 30 supported in the side walls 11 of the frame and are driven from a worm and worm-wheel combination 29 through a gear train 31. During each revolution of the cams 25, 26 and 27 the feed slide 19 for each chute has two reciprocating movements and one idle period during which no unit is fed. Two units are fed in succession on the reciprocating movements so that in each cycle (of cam revolution) a total or two units are fed out of the respective chutes to drop into the respective buckets of the conveyor. Referring to FIG. 20, it will be seen that, on a first cycle, one biscuit or sandwich unit 18 will be fed to each of the buckets 32 of the conveyors 33 and 35 but none to conveyor 34; one each to conveyors 33 and 34 and none to conveyor 35; and one each to conveyors 34 and 35 and none to conveyor 33. With this succession of feed, the cross feeders 66, to be later explained, can move single units 18 off conveyor 35 and on top of the biscuit units or into the empty buckets of conveyor 34 and can also at an advanced position, as seen in FIG. 20, complete a two-high stack of units 18 in each bucket of the conveyor 34. This is accomplished by the sweep of the pins 73 of each cross-feed disk 66 over the conveyors 33 and 35 and the coordinated travel of the conveyors and rotary speed of the disks 66, which travel and speed, provide a component pushing action that moves each unit 18 lengthwise with the conveyor and at the same time crosswise thereof. Each single unit in FIG. 20 is designated S and each double unit D. The elevator cam 28 (FIG. 14) actuates a cam arm 28A secured to a cross stud 28B (FIG. 5) which in turn rocks arms 28C connected to each link 23 through the medium of a lever arm 28D. The purpose of the elevator is to coact with the horizontal movement of the link 23 by lifting the free end of the latter and lowering it to provide an oval path of movement for each slide 19 as indicated in FIG. 4A. When the slide engages a biscuit unit it pushes the same off the foot 22, the next upper unit being held back by a plate 20 which is held in an adjusting device 20A so that the opening below the plate can be closely controlled. When the unit has been pushed off the foot 22 the slide has a lowering return movement which permits the next unit above to lower on to the foot without being damaged by the retract movement of said slide. The contents of the chutes are agitated through the use of a jogger 40 operated from stud 28B and the height of the foot plate may be controlled by an adjusting mechanism 22A. The elevator cam has three cam arm 28A rocking areas that coact with the operating areas of the cams 25, 26 and 27 so that coordinated action of the link 23 and arm 28C-28D occurs.

As each cracker sandwich unit 18 is projected out of its respective chute it drops into the open sided channel shaped buckets 32 of each of three chain conveyors 33, 34 and 35 (FIGS. 19 and 18) two of the supply conveyors 33 and 35 being arranged in flanking relation to the center conveyor 34, which is at a lower level than the conveyors 33 and 35, and which may be referred to as an accumulator conveyor means. At one end, each conveyor 33, 34 and 35 engages a sprocket wheel 36 fixed to a sleeve 37 mounted on a shaft 38, the sleeve being driven from a sleeve 39 secured to a drive shaft 41 to which is fixed a drive gear 42 forming part of a train of gears 43, 44, 45, 46 and 47, the gear 44 being secured to a main drive shaft 49 deriving its power from any suitable source. The sleeve 39 carries the drive sprocket wheels 51 and 52 for propelling the conveyors 33 and 35, respectively, while the conveyor 34 is driven from a sprocket wheel 53 secured to a sleeve 54 mounted on a shaft 55. The sleeve 54 carries two other sprocket wheels 56 for propelling transfer conveyor chains 57 carried by the sprocket wheels 58 mounted on a sleeve 59 and secured to a shaft 61 driven by gear 43. The driving means may be referred to collectively as a train of parts, for convenience. The sleeve 59 also carries a sprocket wheel 62 about which, and a tensioning device 63, is driven a wrapper conveyor chain 64 carrying item supporting platforms 65.

As the biscuit units 18 are deposited in the buckets of each of the conveyors 33, 34 and 35 and are carried along, the units 18 in conveyors 33 and 35 are intercepted by cross-feeders 66 (FIG. 19) each of which consists of a disk 67 mounted on a vertical shaft 68 carrying a bevel gear 69 at its lower end for meshing engagement with a similar bevel gear 71 secured to a shaft 72 driven by the gears 46 and 47 (FIG. 17). Each cross-feed disk 67 has spaced depending pins 73 or rollers which pass across the buckets of the conveyors 33 and 35 and push a biscuit unit 18, into each bucket, or over on top of the biscuit unit 18 in a bucket in the conveyor 34 as previously explained. The cross-feeders 66, protected by a cover 70, are spaced longitudinally of the conveyors so that the units 18 will be fed first out of one conveyor 35 and then out of the other conveyor 33 for providing a high speed operation. The accumulator conveyor 34 passes between wrapper conveyor 64 and transfer conveyor 57. The latter includes upper and lower brackets 74 and 75 respectively (FIGS. 8, 9, and 10), to which are secured an upper cam plate 76 and a lower cam plate 77, respectively. The chains of conveyor 57 carry spaced pins or rods 78 for pivotally supporting cradles 79 in which are slidably disposed for lateral movement pushers, or transfer means 81. The latter are flat bar members each having a cam follower roller 82 for engagement alternately with the edges of the upper and lower cam plates 76 and 77, respectively, to provide for positive projection and retract movement of an enlarged button end 83 on each pusher 81. As clearly seen in FIG. 7, the travel of the conveyor 57 rides the cam rollers 82 over the edge of the cam 76 to push the accumulated pile of cracker units 18 out of each bucket 32 of the accumulating conveyor 34 and on to each unit platform 65 of the wrapper conveyor 64 adjacent thereto. As the rollers continue their return travel along cam 77 the pushers are retracted. Each pusher bar 81 has a limit pin 84 at the end opposite its button end 83 so that its movement in projection can be controlled. As the cracker units 18 are pushed off conveyor 34 they are spaced on conveyor 64 because each item occupies its unit platform 65. The object has been to take three stacks (chutes) of sandwich units 18, feed them to three conveyors, assemble them in one conveyor in paired relation and then transfer them to a wrapper conveyor. In order to get the end result the two-high stack of units 18 must be placed in end to end contact in horizontal form so that they can be packaged in this item form. The chain 64, between each two platforms 65, carries a stud 85 (FIG. 8) so that as the conveyor 64 carries the units 18 along they are pushed up on a dead plate 86 having a space through which rides the pins 85. Each pin assembles two units in longitudinal contact on the dead plate 86 to make up an item and pushes them on to a belt conveyor, which forms part of a wrapping mechanism with which this application is not concerned. A suitable speed adjusting device is shown at 87 for the proper action of the wrapper conveyor.

In the art it has been the endeavor to transfer objects in different directions through the use of wheels between conveyors, but this method is slow, does not operate at high speed, damages fragile articles like brittle crackers and in general has to be devised in the shape of the article being transferred. In the present invention the transfer disks or cross feeders 66 and 81 operate at high speed, apply a delicate push to the units and leave them at their destination without danger of crumpling or damaging.

The cross feed disks 66 being spaced feedwise of the conveyors coact with the spacing feed of the slides 19 so that, as seen beginning at the left in FIG. 20, the single cracker units 18 occupying conveyors 33 and 35 will be moved in succession, by the operation of the feed disks 66, to the middle or accumulator conveyor 34 to provide a two-high sandwich pile, designated D in FIG. 20. The unit 18 (second from the left) in conveyor 33 will be pushed over on top of a similar unit 18 already in conveyor 34 by the action of the feed disk 66 serving conveyor 33. The unit 18 in third position from the left in conveyor 35 will be pushed over on top of a similar unit 18 already in conveyor 34 by the action of the feed disk 66 serving the conveyor 35. The spaces left between the units 18 in conveyor 34 must each receive two units 18 as supplied from the conveyors 35 and 33 by their respective feed disks 66 while the buckets of the conveyor 34 that have already received one unit 18 each, will each receive another unit 18 from each of the conveyors 33 and 35.

Thus it will be appreciated that the small interval of time taken to transfer the units 18 crosswise from parallel and adjacent conveyors, in continuous operation of the conveyors, is advantageous over the use of wheel like transfer means into which the articles are fitted for transfer or change of direction travel. The cross feed or transfer means including the pushers 81 provide for shift of the assembled items during constant travel of the conveyors without any loss of time or motion and hence the means of assembling and feeding the items in the novel manner presented herein involves a new concept in the feeding, assembling and advancing of such units to a wrapping station or other destination.

The invention is not to be limited to the precise details of construction shown since various changes and modifications may be made therein without departing from the scope of the invention or sacrificing the advantages to be derived from its use.

What is claimed is:

1. In a machine for assembling sandwich units or the like to be wrapped, chute means, conveyor bucket means aligned with each chute means for receiving said units including central and flanking conveyor bucket means and wrapping conveyor means moving in parallel relation at substantially like speeds of travel, cross feed means for moving units out of the buckets of the flanking conveyor means and into the buckets of the central conveyor means to form a two-high unit pile in the buckets of said central conveyor means, and means for successively transferring each unit pile from the buckets of the central conveyor means to said wrapping conveyor.

2. In a machine for assembling sandwich units to be wrapped, chute means, means for feeding the units out of the chute means, conveyor means, including buckets, aligned with each chute means for receiving the units fed out of the chute means, said conveyor means also including central and flanking conveyors moving at the same speed in parallel relation, a wrapper conveyor adjacent said central conveyor, cross feed means for moving units off the flanking conveyors and to said central conveyor and transfer means for moving units off said central conveyor to said wrapper conveyor.

3. A machine as set forth in claim 2 in which said chute means includes a slotted foot means for supporting the units in a vertical pile and an adjusting plate on the chute, coacting with said means for feeding the units out of the chute, for restraining feed movement of the unit resting on the unit to be fed out of the chute.

4. A machine as set forth in claim 2 in which said means for feeding the units out of the chute means includes slide means, cam means for reciprocating said slide means and means controlled by said cam means for deviating the path of travel of said slide means in return direction and out of contact with the unit to be next fed.

5. A machine as set forth in claim 2 in which said means for feeding the units out of the chute means includes slide means, cam means for reciprocating the slide means in an oval path to avoid contact with the next unit to be fed on retract movement of the feed means and said cam means having a dwell portion for restraining reciprocatory movement of the slide means during a part of one cycle of operation of said cam.

6. A machine as set forth in claim 2 in which said central and flanking conveyors include laterally open channel shaped buckets maintained in lateral alignment by the travel of said conveyors.

7. A machine as set forth in claim 2 in which said wrapper conveyor includes unit receiving platform means aligned with the buckets of said central conveyor means, a slotted dead plate under which the wrapper conveyor passes, and stud means between pairs of said platform means projecting through said slot for moving the units deposited on said dead plate into item formation for deposit on a belt conveyor.

8. A machine as set forth in claim 2 in which the cross feed means includes rotary disk means adjacent the flanking conveyors having circumferentially arranged pin means for sweeping across said adjacent flanking conveyors to feed the cracker units off said flanking conveyors to said central conveyor, and said disk means being spaced feed wise of said conveyors.

9. A machine as set forth in claim 2 in which the transfer means includes upper and lower plates, one presenting a project cam edge and the other presenting a retract cam edge, a transfer conveyor chain means paralleling said central conveyor, and slide means mounted on said transfer conveyor chain means for control by, said upper and lower cam plates for pushing units out of the central conveyor on to said wrapper conveyor.

10. A machine as set forth in claim 2 in which the bottoms of the buckets of said central conveyor are in a plane lower than the bottoms of the buckets of said flanking conveyors.

11. In a machine for assembling sandwich units to be wrapped, chute means, conveyor means, including a central conveyor and flanking conveyors aligned with each chute means, means for feeding units out of all the chute means, separated in paired succession to provide spaces between said pairs, into said conveyor means, and cross feed means arranged in longitudinally spaced relation with respect to said flanking conveyor means for moving the units out of said flanking conveyor means and into the central conveyor means to provide unspaced two-high sandwich units in said central conveyor means.

12. A machine as set forth in claim 2 in which said wrapper conveyor includes linked unit platforms and linked stud means between each pair of platforms, a dead plate slotted to allow passage of said stud means for pushing units along said dead plate to a belt conveyor and said stud means closing the space between each pair of units during travel of the latter along said dead plate.

13. In a machine for assembling sandwich units to be wrapped, conveying means including laterally open channel shaped buckets in which units are transported, a wrapper conveyor alongside said conveying means having unit receiving platforms laterally aligned with said buckets, a transfer conveyor means at the opposite side of said conveying means from said wrapper conveyor including laterally spaced moving chains, cradle means carried by said chains in lateral alignment with the buckets of said conveying means, pusher means slidably mounted in said cradle means, and cam means for projecting and retracting said pusher means during travel of said chains for gradually moving the units out of the buckets of said conveying means and on to the platforms of said wrapper conveyor during travel thereof.

14. In a machine for assembling sandwich units to be wrapped in item form, chute means, a central accumulator conveyor and flanking supply conveyors, means for moving the conveyors at the same speed, means for feeding the units out of said chute means for arrangement in each of the conveyors in spaced longitudinally paired relation, cross feed means adjacent each supply conveyor comprising a disk, spaced pin means arranged adjacent the periphery of the disk for feeding units out of the supply conveyors and into said accumulating conveyor, and means for rotating each disk at a speed commensurate with the travel speed of the conveyors whereby a component force provided by said disk and conveyor speeds effects transfer of said units from the supply to the accumulating conveyors during travel of all of said conveyors.

15. In a machine for assembling sandwich units to be wrapped in item form, chute means, a central accumulating conveyor and flanking supply conveyors, moving at the same speed in parallel relation, means for feeding units out of the chute means for arrangement in each of the conveyors in spaced longitudinally paired relation, cross feed means including a disk adjacent each supply conveyor having depending pin means for moving units out of the supply conveyors and into said accumulating conveyor and means for rotating each disk at a speed commensurate with the travel speed of the conveyors whereby the synergetic action of said cross feed means effects transfer of the units from the supply conveyors to the accumulating conveyor during travel of said conveyors.

16. A machine as set forth in claim 14 in which said cross feed means are disposed in spaced relation feedwise of said conveyors.

17. A machine as set forth in claim 15 in which said cross feed means are disposed in spaced relation feedwise of said conveyors and in which the spaced longitudinally paired relation of the units in each conveyor results in the accumulation of two units stacked at each unit location in the accumulating conveyor.

18. A machine as set forth in claim 14 in which said cross feed means are disposed in spaced relation feedwise of said conveyors and said accumulator conveyor is in a lower plane than said supply conveyors.

19. In a machine for assembling sandwich units to be wrapped in item form, chute means, parallel conveyors aligned with said chute means, means for feeding units one at a time out of each of said chute means, a slotted foot piece on said chute means for supporting a stack of units in the chute means, means for adjustably raising and lowering said foot piece, means for jogging said chute means, and means for moving said unit feeding means in different directions during feeding and return actions whereby the adjacent upper unit will not be disturbed and the feeding means will be retracted in a path below said foot piece.

References Cited by the Examiner
UNITED STATES PATENTS
2,881,900  4/59  Packman _____ 198—35

SAMUEL F. COLEMAN, *Primary Examiner.*